United States Patent

(12) United States Patent
Francisco et al.

(10) Patent No.: US 7,787,583 B2
(45) Date of Patent: Aug. 31, 2010

(54) HANDLING POLES FOR USE IN NUCLEAR REACTORS

(75) Inventors: Gregory A. Francisco, Fremont, CA (US); Robert W. Whitling, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 11/150,196

(22) Filed: Jun. 13, 2005

(65) Prior Publication Data

US 2010/0014622 A1    Jan. 21, 2010

(51) Int. Cl.
*G21C 19/00* (2006.01)

(52) U.S. Cl. .................... 376/260; 376/262; 414/23

(58) Field of Classification Search ........... 376/249, 376/260–264, 268–269; 403/109.2; 414/23
See application file for complete search history.

(56) References Cited

U.S. PATENT DOCUMENTS

| | | | | | |
|---|---|---|---|---|---|
| 1,512,680 | A | * | 10/1924 | Edstrom | 56/340 |
| 2,311,355 | A | * | 2/1943 | Thornquist | 135/114 |
| 3,423,781 | A | * | 1/1969 | Henson | 15/145 |
| 4,079,978 | A | * | 3/1978 | McMullin | 294/19.1 |
| 4,111,217 | A | * | 9/1978 | Victor | 135/114 |
| 4,292,130 | A | * | 9/1981 | Viaud et al. | 376/262 |
| 4,524,484 | A | * | 6/1985 | Graham | 16/429 |
| 4,800,834 | A | * | 1/1989 | Feng | 116/173 |
| 4,856,929 | A | * | 8/1989 | Smahlik et al. | 403/297 |
| 5,493,758 | A | * | 2/1996 | Carmien | 16/429 |
| 5,513,622 | A | * | 5/1996 | Musacchia, Sr. | 124/89 |
| 5,623,525 | A | | 4/1997 | Jensen | |
| 5,690,005 | A | | 11/1997 | Jung et al. | |
| 5,823,578 | A | * | 10/1998 | Chiou | 285/38 |
| 5,878,099 | A | | 3/1999 | Burrows et al. | |
| 6,045,284 | A | * | 4/2000 | Chiu | 401/289 |
| 6,168,212 | B1 | * | 1/2001 | Finley | 285/377 |
| 6,213,672 | B1 | * | 4/2001 | Varga | 403/109.2 |
| 6,257,256 | B1 | * | 7/2001 | Fischer | 134/167 R |
| 6,502,321 | B1 | * | 1/2003 | Crain et al. | 33/296 |
| 6,526,114 | B2 | * | 2/2003 | Paillaman et al. | 376/249 |
| 6,622,941 | B2 | | 9/2003 | Ganoza et al. | |
| 6,701,578 | B1 | * | 3/2004 | Lu | 16/429 |
| 6,905,080 | B2 | * | 6/2005 | Pohorecki | 239/280 |
| 6,925,686 | B2 | * | 8/2005 | Heathcock et al. | 16/429 |
| 7,155,613 | B2 | * | 12/2006 | Master et al. | 713/182 |
| 7,158,127 | B1 | * | 1/2007 | Dotson | 345/204 |
| 2003/0192187 | A1 | * | 10/2003 | Bean | 30/164.6 |
| 2004/0108259 | A1 | * | 6/2004 | Giannantonio | 210/169 |

OTHER PUBLICATIONS

Merriam-Webster's Collegiate Dictionary, Tenth Edition, p. 13, 1998.*

* cited by examiner

*Primary Examiner*—Rick Palabrica
(74) *Attorney, Agent, or Firm*—Harness, Dickey & Pierce, P.L.C.

(57)    ABSTRACT

An apparatus and method for manufacturing a handling pole including a pole section, a pole adapter connected to one end of the pole section, a spade member connected to the other end of the pole section, and a nut assembly for connecting adjoining poles. The pole adapter may include an upper sleeve and the spade member may include a lower sleeve.

20 Claims, 5 Drawing Sheets

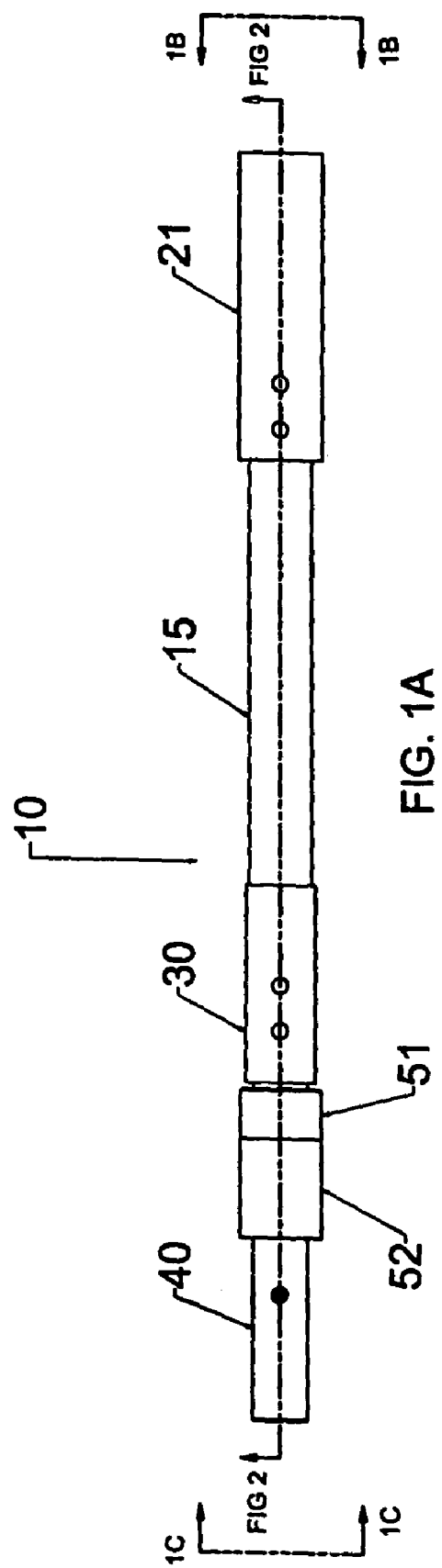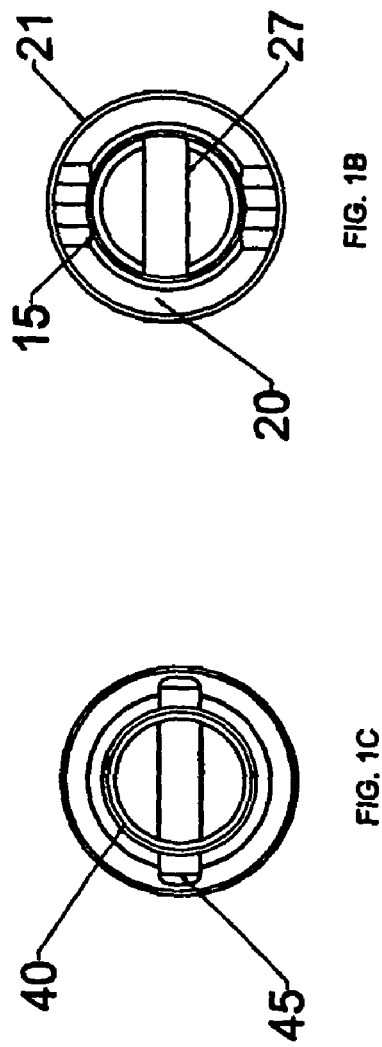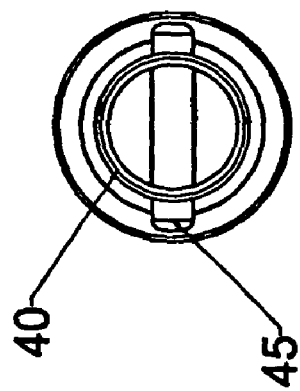

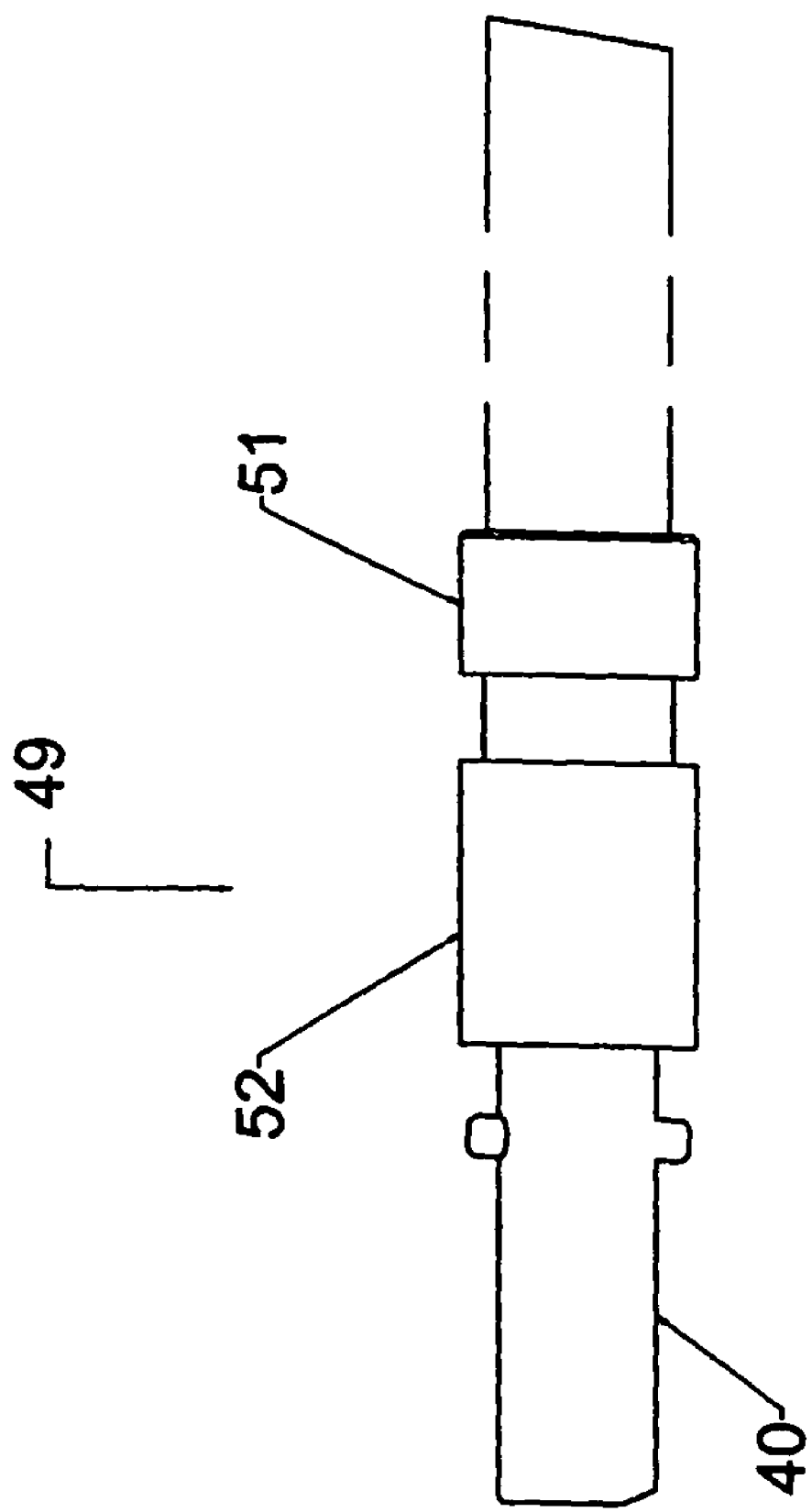

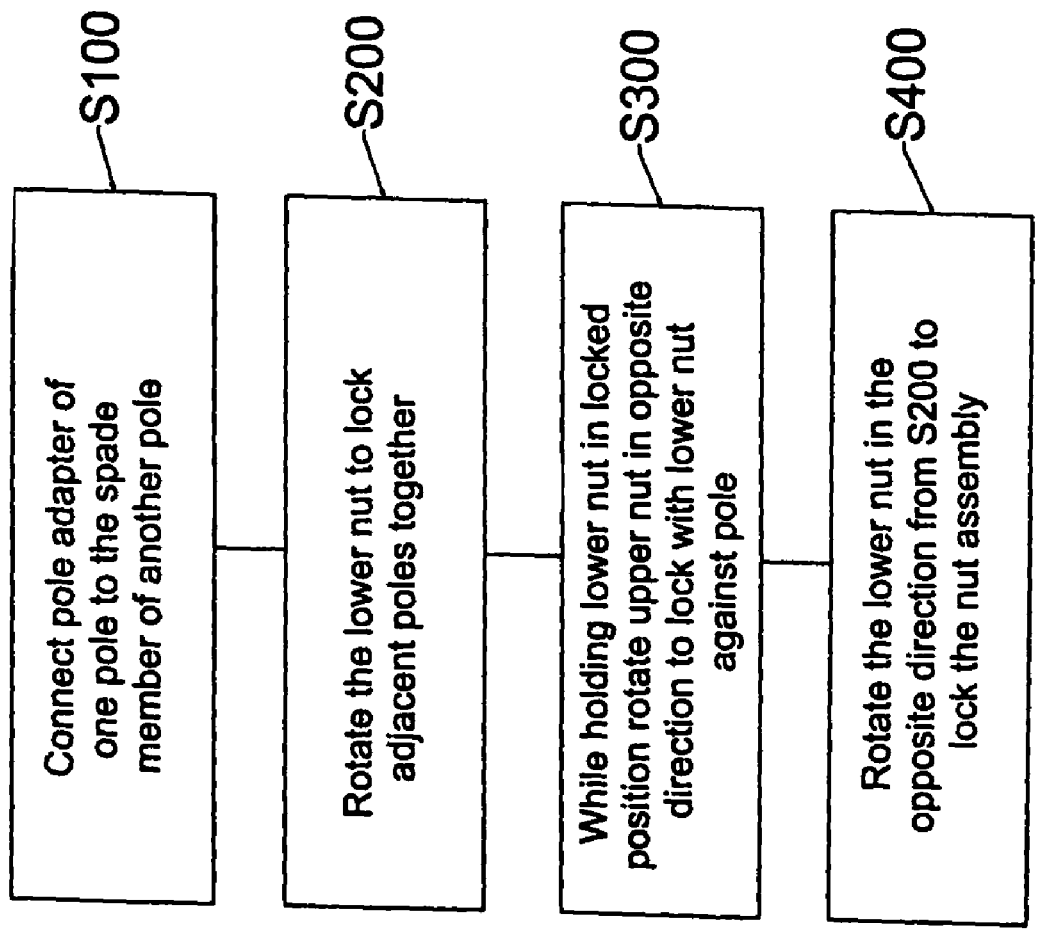

HANDLING POLES FOR USE IN NUCLEAR REACTORS

BACKGROUND OF THE INVENTION

1. Field of the Invention

This invention relates generally to a tool for handling high torque, more specifically, a locking nut for a handling pole in a nuclear reactor pressure vessel.

2. Description of Related Art

Repairs and inspections performed within a reactor pressure vessel (RPV) such as a boiling water reactor (BWR) are generally performed with ropes and poles for manual manipulation of tools and/or delivery of dedicated automated tools. The RPV is generally a cylindrical shaped vessel and is closed at both ends (e.g., a bottom head and a removable top head). During a reactor shut down, the top head of the RPV is removed so as to inspect or repair a selected component within. Other components in the RPV located between a top guide and a core plate or below the core plate may also be removed. To perform the inspections and/or repairs, an operator stands on a bridge positioned over the RPV and lowers the tool using ropes and poles, which may extend about eighty (80) feet below. The ability to perform such inspections and/or repairs depends on the dexterity of the operator.

Due to the difficulty in accessing certain locations within the RPV, performing the repairs and/or inspections at such locations can be time consuming and burdensome. It is desirable to limit the time required to perform the repairs and/or inspections in a RPV due to the enormous daily cost of the reactor being shut down (up to almost a million dollars a day in lost revenue). Reducing the amount of time required to perform such inspections and/or repairs also would facilitate reducing radiation exposure to operators, technicians arid maintenance personnel, for example.

An approach to repairing and/or inspecting equipments in the RPV has been to use handling poles to attach tools for repairing and servicing. The handling poles are light-weight and thus easy to maneuver within the RPV. Further, handling poles may be designed specifically to handle high-torque. The handling poles may be generally constructed in 10-foot sections and assembled to work in depths of over 80 feet.

However, conventional handling poles typically employ a single nut to connect and lock the adjoining poles together. The single nut is typically hand tightened by an operator to lock the two poles together, and then an adhesive tape (i.e., duct tape) is attached around the nut to prevent it from inadvertently unlocking during operation. However, use of adhesive tape is not an effective manner to retain the nut on two adjoining metal poles, because the adhesive tape maybe exposed to hot water which degrades the adhesive on the tape and cause separation of the adjoining poles. Even further, during pole disconnection, it maybe necessary to first unwrap the tape. This action causes droplets of contaminated water to occasionally be expelled from the tape and may contact workers causing skin contamination. The degraded tape also leaves the glue behind on the pole sections in which radiological contaminations may stick to the adhesive tape residue and cause radiological exposure to operators and radioactive contamination issues.

SUMMARY OF THE INVENTION

Exemplary embodiments of the present invention provide a handling pole for use in a nuclear reactor. The handling pole may include a pole section, a pole adapter connected to one end of the pole section, a spade member connected to the other end of the pole section, and a nut assembly for connecting adjoining poles. The pole adapter may include an upper sleeve and the spade member includes a lower sleeve.

Another exemplary embodiment of the present invention provides a nut assembly for connecting adjoining poles in a nuclear reactor. The nut assembly may include an upper nut having threads on inside surface, and a lower nut having threads on the inside surface and the outside surface, wherein the upper nut threads on to the lower nut's outside surface threads.

Another exemplary embodiment of the present invention provides a method of assembling a nut assembly for a handling pole. The method may include connecting a pole adapter to a spade member of the handling pole, rotating a lower nut towards the connected pole adapter and spade member, and rotating an upper nut in an opposite direction to lock the lower nut.

BRIEF DESCRIPTION OF THE DRAWINGS

Exemplary embodiments of the present invention will become more apparent by describing, in detail, exemplary embodiments thereof with reference to the attached drawings, wherein like procedures are represented by like reference numerals, which are given by way of illustration only and thus do not limit the present invention.

FIG. 1A is a side view of a handling pole in accordance with an exemplary embodiment of the present invention.

FIG. 1B is a cross-section B-B of the handling pole of FIG. 1A in accordance with an exemplary embodiment of the present invention.

FIG. 1C is a cross-section C-C of the handling pole of FIG. 1A in accordance with an exemplary embodiment of the present invention.

FIG. 4 is a schematic view of the nut assembly in accordance with an exemplary embodiment of the present invention.

FIG. 5 is a flowchart illustrating the method for attaching the nut assembly in accordance with an exemplary embodiment of the present invention.

DETAILED DESCRIPTION OF EXEMPLARY EMBODIMENTS

It should be noted that these Figures are intended to illustrate the general characteristics of method and apparatus of exemplary embodiments of this invention, for the purpose of the description of such exemplary embodiments herein. These drawings are not, however, to scale and may not precisely reflect the characteristics of any given embodiment, and should not be interpreted as defining or limiting the range of values or properties of exemplary embodiments within the scope of this invention. The relative dimensions and size of pole assembly may be reduced or exaggerated for clarity. Like numerals are used for liked and corresponding parts of the various drawings.

Exemplary embodiments of the present invention may prevent and/or reduce radiological contaminations and doses during assembling and dis-assembling of the handling tool.

Exemplary embodiments of the present invention may prevent and/or reduce inadvertent pole disassembly during operation.

Exemplary embodiments of the present invention may provide easier and quicker connections of the pole assembly. The connection may be assembled and operated by a single operator. Thus, reduced pole assembly and disassembly time are achieved.

FIG. 1A a side view of a handling pole in accordance with an exemplary embodiment of the present invention. Referring to FIG. 1A, the handling pole 10 includes a pole section 15, a pole adapter 20 connected at one end and a spade member 40 connected at the other end. As an example, the pole adapter 20 and the spade member 40 may be welded to the pole section 15. However, it should be appreciated that other attachments may be employed to connect the pole adapter 20 and spade member 40 to the pole section 15. The entire or section of the handling pole 10 may be composed of a lightweight metal, such as, but not limited to, aluminum.

The handling pole 10 is adaptable to produce torque over 100 ft-lb. Each section of the handling pole 10 may be 10 feet in length, and designed to work up to 100 feet depth in the reactor. However, it should be appreciated that each handling pole 10 may be designed as 3 feet, 5 feet or other lengths, depending on the application of the pole. The handling pole 10 may also be the same size as an existing pole, and thus interchangeable with the existing pole (e.g., used for general purpose or non-high torque applications). As a result, the handling pole 10 may reduce the overall job time and may save the cost of developing, building and shipping alternate tooling, such as jet pump breaker poles.

It should be appreciated that the handling pole 10 may also be used as a replacement for heavy-weight high torque poles used, for example, in jet pump beam tensioning. The heavy-weight high torque pole is described in co-pending U.S. application entitled "Apparatus and Method for Measuring Rotation During Jet Pump Tensioning" assigned to General Electric Co., which is hereby incorporated by reference in its entirety.

Figure 2:
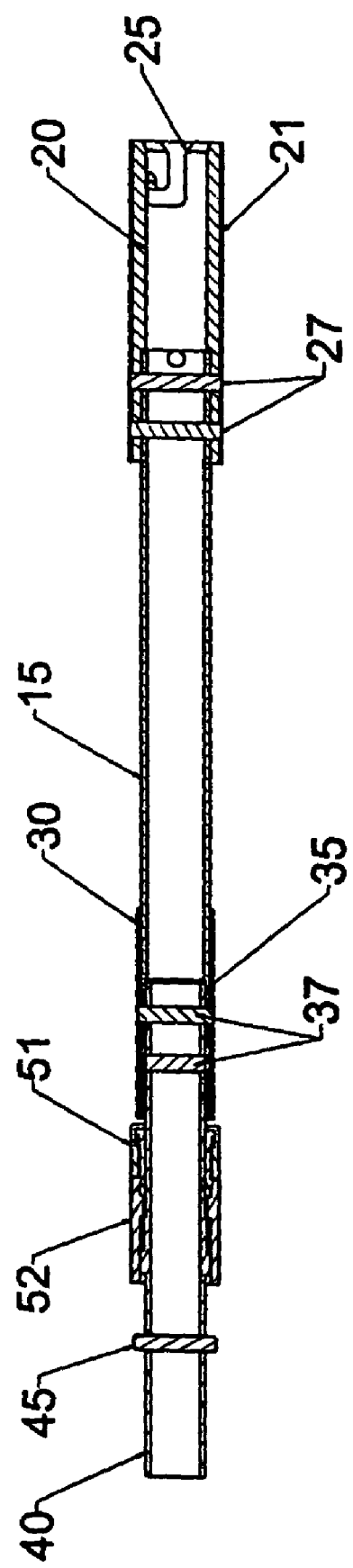
FIG. 2 is a cross-section A-A of the handling pole of FIG. 1A in accordance with an exemplary embodiment of the present invention.

FIG. 2 is a cross-section A-A of the handling pole of FIG. 1A in accordance with an exemplary embodiment of the present invention. As shown in FIG. 2, the pole adapter 20 has a pair of J-shaped slots 25 (only one of which is shown in FIG. 2) which may receive and interlock with a corresponding pin 45 on spade member 40 (adjacent handling pole). The J-shaped slots 25 provide a slot for pin 45 to slide into so as to provide an engagement between adjacent handling poles 10. The J-shaped slots 25 may be machined into the pole adapter 20. The pole adapter 20 may be made of, for example, aluminum or any other lightweight metal.

An upper sleeve 21 may surround the pole adapter 20 as shown in FIG. 2 for reinforcement. The upper sleeve 21 may be made from stainless steel so as to prevent the J-shaped slots 25 from spreading (deforming) when torque greater than, for example, 50 ft lbs is applied. It should be appreciated that the upper sleeve 21 may be made from other materials, such as steel, aluminum, engineered plastic materials and/or any combination thereof.

The pole adapter 20 includes a pair of dowel pins 27 attached to the pole section 15. The dowel pins 27 may be welded to the upper sleeve 21 at both sides (shown in FIG. 1B) to prevent the pole section 15 from buckling around the pins 27. In other words, the dowel pins 27 penetrate the upper sleeve 21, the adapter pole 20 and the pole section 15, and penetrate through the other side (e.g., the pole section 15, the adapter pole 20 and the upper sleeve 21). The dowel pins 27 may be welded to the upper sleeve 21 on both sides to transmit the torque from the J-slot 25 to the pole section 15. The pins 27 may be made from, for example, but not limited to, stainless steel. The pins 27 may be ¼ inch in diameter. It should be appreciated that other diameter sizes may be employed.

Figure 3:
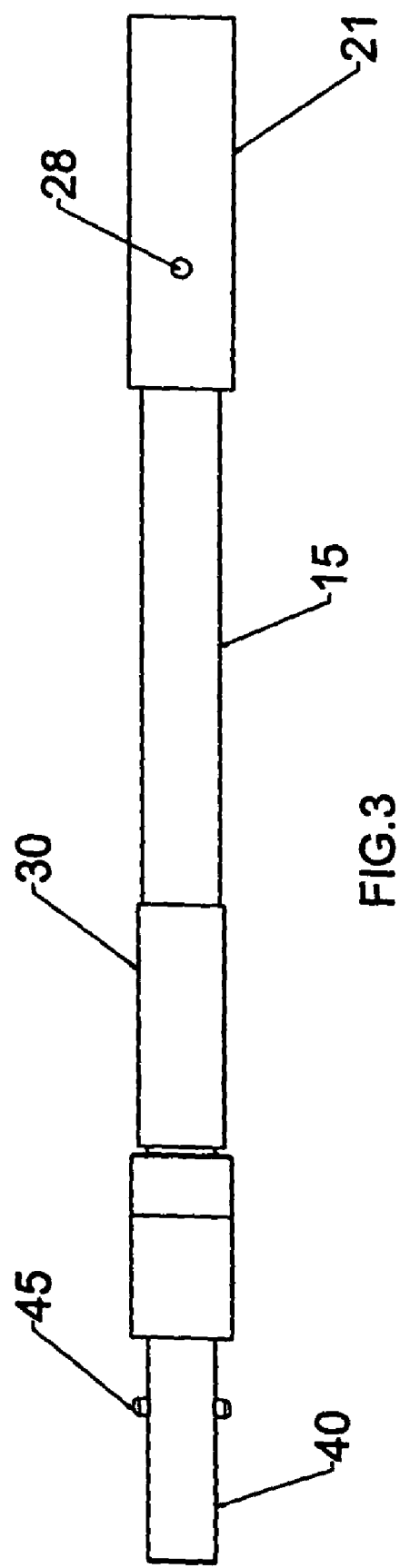
FIG. 3 is a side view of the handling pole rotated in accordance with an exemplary embodiment of the present invention.

FIG. 3 is a side view of the handling pole rotated in accordance with an exemplary embodiment of the present invention. As shown in FIG. 3, the pole adapter 20 includes a drain hole 28. The drain hole 28 is provided to flush out any fluid trapped in the pole adapter 20. The drain hole 28 may have a diameter of ¼ inch. It should be appreciated that there may be more than one drain hole 28 in the adapter 20. It should further be understood by one of ordinary skilled in the art that the size of the drain hole 28 and pins 27 may vary according to the application of the handling pole.

Referring again to FIG. 2, the pole section 15 is also attached to a spade member 40. The spade member 40 slidably fits within a thinned section 35 of the pole section 15. In other words, the spade member 40 may act as a male connector for engaging with the pole adapter 20. The thinned section 35 of the pole section 15 may be embodied as having a larger bore diameter than the bore diameter of the adapter pole 20. As an example, the pole section 15 attached to the spade member 40 may have a bore diameter of approximately 0.905 inches and the pole section 15 attached to the adapter pole 20 may have a bore diameter of approximately 0.860 inches. The spade member 40 may be made from, for example, but not limited to, aluminum.

The spade member 40 includes a spade pin 45 to slidably engage into the J-shaped slots 25. The spade pin 45 has a dimension to engage with the J-shaped slots 25 and withstand the produced torque without failure. The spade member 40 may be bored with a hole (i.e., approximately 6 mm) through both sides of the spade member 40 so that the spade pin 45 can be inserted. The spade pin 45 is welded to the spade member 40 at both sides (shown in FIG 1C) so as to prevent buckling. In other words, the spade member 40 is machined with holes on both side of the spade member 40 for spade pin 45 to be inserted and welded within the hole. The spade pin 45 is then centered in the spade member 40 and welded at least in four areas (e.g., on both sides of the spade pin 45 and on both sides of the spade member 40). The spade pin 45 may extend approximately 0.178 inches out from the surface of the space member 40. The spade pin 45 may be made from, for example, but not limited to, stainless steel. It should be appreciated by one skilled in the art that the dimensions of the spade pin 45 may be employed with different sizes.

The spade member 40 is attached to the pole section 15 via a pair of lower pins 37. The lower pins 37 may be similar and may function the same as the dowel pins 27 found in the pole adapter 20. The area engaging the spade member 40 and the pole section 15 is surrounded with a lower sleeve 30 for reinforcing the connection. The lower sleeve 30 is also attached to the spade member 40 through the pair of lower pins 37. The pins 37 are welded to the sleeve 30 at both sides so as to prevent the pole section 15 from buckling around pins 37. In other words, the lower pins 37 may penetrate the lower sleeve 30, the pole section 15 and then the spade member 40, and penetrate out the other side (e.g., the spade member 40, the pole section 15 and then the lower sleeve 30). The lower pins 37 are welded to the lower sleeve 30 on both sides to prevent buckling of the thinned area of the section pole 15 and transmit torque through the spade pins 45. The lower sleeve 30 may be made of, for example, but not limited to, stainless steel, aluminum, steel, engineered plastic materials and/or any combination thereof. As an example, the lower sleeve 30 may be made from the same material as the upper sleeve 21 for ease in manufacturing. The pins 37 may be made from, for example, but not limited to, stainless steel. The lower pins 37 may be ¼ inch in diameter. It should be appreciated that other diameter sizes may be employed.

The handling pole 10 includes a nut assembly 49 (shown in FIG. 4). The nut assembly 49 may include an upper nut 51 and a lower nut 52 on the spade member 40. The upper nut 51 and the lower nut 52 are used to connect, and lock together, handling poles 10 that are used to service nuclear reactor internal components.

FIG. 4 is a schematic view in detail of the nut assembly in accordance with an exemplary embodiment of the present invention. As shown in FIG. 4, the lower nut 52 is threaded around the spade member 40, and the upper nut 51 is threaded around the lower nut 52. The upper nut 51 has threads in its inside surface and the lower nut 52 has threads on the inside and the outside surface. As an example, the thread of the upper nut 51 has 1³⁄₁₆ 12 thread/in, and the thread of the lower nut 52 has 1³⁄₁₆ 12 thread/in on the outside and 1¹⁄₁₆ 8 thread/in on the inside. It should be appreciated that there are no threads exposed so as to protect the threads from damages caused by inadvertent knocking and striking.

When the pole 10 is connected to another pole, the lower nut 52 rotates toward (e.g., clockwise CW) the connected pole and tightened by the operator. In other words, the lower nut 52 provides the hand-tightened locking function between the connected poles. Then the upper nut 51 is threaded and tightened in the opposite direction (e.g., counterclockwise CCW) of the lower nut 52 to provide an additional locking force to the lower nut 52.

The lower nut 52 may be a brass material, and the upper nut 51 may be a stainless steel material. However, it should be appreciated that the upper nut 51 and the lower nut 52 may be formed with other materials, such as, for example, steel, copper, stainless steel, iron, aluminum, zinc, and/or combination thereof.

Each of the surfaces of the upper nut 51 and the lower nut 52 is formed with a non-slip grip via, for example, a knurling procedure. As an example, the non-slip grip may be shaped as a diamond-like shape. It should be appreciated that other shapes may be employed besides the diamond-like shape.

FIG. 5 is a flowchart illustrating the method for attaching the nut assembly in accordance with an exemplary embodiment of the present invention. As shown in FIG. 5, initially one section of a handling pole 10 is connected to another section of an adjacent pole (S100). In other words, the spade pin 45 in the spade member 30 of one handling pole engages in the J-shaped slot 25 in the pole adapter 20 of another handling pole. Once the poles 10 are connected, the lower nut rotates (e.g., clockwise CW) until it engages with the connected poles 10 and lock the poles 10 together (S200). Then the upper nut 51 is rotated in the opposite direction (e.g., counterclockwise CCW) until it becomes taut so as to lock the lower nut 52 (S300). The operator then rotates the lower nut 52 in the opposite direction from the initial rotation (e.g., counterclockwise CCW) to provide a final tightening procedure (S400). As a result, the nut assembly 49 provides a tight connection between the adjoining poles.

Exemplary embodiments of the present invention may prevent and/or reduce inadvertent pole disassembly during operation.

Exemplary embodiments of the present invention may provide easier and quicker connections of the pole assembly. The connection may be assembled and operated by a single operator. Thus, reduce pole assembling time Exemplary embodiment of the present invention provides the pole adapter having a J-shaped slot which receive and interlock with a corresponding pin on an adjacent handling pole. The J-shaped slot prevents and/or reduces the pole adapter from dis-engaging with the spade member. Exemplary embodiment of the present invention provides a pair of upper pins welded to the upper sleeve at both sides to prevent the pole section from buckling around the upper pins.

Exemplary embodiment of the present invention provides a pair of lower pins welded to the lower sleeve at both sides to prevent the pole section from buckling around the lower pins.

Exemplary embodiment of the present invention provides the spade member having a spade pin to slidably engage into J-shaped slots. The spade pin welded to the spade member at both sides of the spade member prevents buckling.

Exemplary embodiment of the present invention provides machining at least one hole in both sides of the upper sleeve, adapter pole and the pole section, inserting at least one upper pin into the hole, and welding the at least one upper pin on the upper sleeve.

Exemplary embodiments of the present invention may provide an apparatus tool for handling high-torque over 100 ft lbs. The handling tool may be lightweight so as to be assembled by hand and easily manipulated by the operator without the need of a overhead crane or hoist.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed:

1. A handling pole for use in a nuclear reactor, the handling pole comprising:
   a pole section;
   a pole adapter;
   an upper sleeve;
   a spade member;
   a lower sleeve; and
   a nut assembly;
   wherein the pole adapter is connected to a first end of the pole section,
   wherein the upper sleeve is disposed around the connection of the pole adapter to the first end of the pole section,
   wherein the spade member is connected to a second end of the pole section,
   wherein the lower sleeve is disposed around the connection of the spade member to the second end of the pole section,
   wherein the nut assembly is disposed around the spade member,
   wherein the nut assembly is configured to connect adjoining poles,
   wherein the pole adapter is configured to connect the pole section of the handling pole to a spade member of a second handling pole,
   wherein the spade member is configured to connect the pole section of the handling pole to a pole adapter of a third handling pole, and
   wherein the pole adapter includes a J-shaped slot that receives and interlocks with a corresponding pin on the second handling pole.

2. The handling pole of claim 1, wherein the upper sleeve surrounds the pole adapter, and
   wherein the lower sleeve surrounds the spade member and the pole section.

3. The handling pole of claim 1, wherein the upper sleeve is stainless steel, and
   wherein the lower sleeve is stainless steel.

4. The handling pole of claim 1, wherein the pole adapter is made from an aluminum material,
 wherein the spade member is made from the aluminum material, or
 wherein the pole adapter and the spade member are made from the aluminum material.

5. A handling pole for use in a nuclear reactor, the handling pole comprising:
 a pole section;
 a pole adapter;
 an upper sleeve;
 a spade member;
 a lower sleeve;
 a nut assembly; and
 a pair of stainless steel upper pins welded in the pole adapter;
 wherein the pole adapter is connected to a first end of the pole section,
 wherein the upper sleeve is disposed around the connection of the pole adapter to the first end of the pole section,
 wherein the spade member is connected to a second end of the pole section,
 wherein the lower sleeve is disposed around the connection of the spade member to the second end of the pole section,
 wherein the nut assembly is disposed around the spade member,
 wherein the nut assembly is configured to connect adjoining poles,
 wherein the pole adapter is configured to connect the pole section of the handling pole to a spade member of a second handling pole,
 wherein the spade member is configured to connect the pole section of the handling pole to a pole adapter of a third handling pole.

6. The handling pole of claim 1, further comprising:
 a pair of stainless steel lower pins welded in the spade member and the pole section.

7. The handling pole of claim 1, wherein the spade member includes a stainless steel spade pin to slidably engage into a corresponding J-shaped slot on the third handling pole.

8. The handling pole of claim 7, wherein the spade pin is welded to the spade member at both sides of the spade member.

9. A handling pole for use in a nuclear reactor, the handling pole comprising:
 a pole section;
 a pole adapter;
 an upper sleeve;
 a spade member;
 a lower sleeve; and
 a nut assembly;
 wherein the pole adapter is connected to a first end of the pole section,
 wherein the upper sleeve is disposed around the connection of the pole adapter to the first end of the pole section,
 wherein the spade member is connected to a second end of the pole section,
 wherein the lower sleeve is disposed around the connection of the spade member to the second end of the pole section,
 wherein the nut assembly is disposed around the spade member,
 wherein the nut assembly is configured to connect adjoining poles,
 wherein the pole adapter is configured to connect the pole section of the handling pole to a spade member of a second handling pole,
 wherein the spade member is configured to connect the pole section of the handling pole to a pole adapter of a third handling pole, and
 wherein the nut assembly includes:
  an upper nut; and
  a lower nut.

10. The handling pole of claim 9, wherein the lower nut is threaded around the spade member, and
 wherein the upper nut is threaded around the lower nut.

11. The handling pole of claim 5, wherein the upper sleeve surrounds the pole adapter, and
 wherein the lower sleeve surrounds the spade member and the pole section.

12. The handling pole of claim 5, wherein the upper sleeve is stainless steel, and
 wherein the lower sleeve is stainless steel.

13. The handling pole of claim 5, wherein the pole adapter is made from an aluminum material,
 wherein the spade member is made from the aluminum material, or
 wherein the pole adapter and the spade member are made from the aluminum material.

14. The handling pole of claim 5, wherein the spade member includes a stainless steel spade pin to slidably engage into a corresponding J-shaped slot on the third handling pole.

15. The handling pole of claim 14, wherein the spade pin is welded to the spade member at both sides of the spade member.

16. The handling pole of claim 9, wherein the upper sleeve surrounds the pole adapter, and
 wherein the lower sleeve surrounds the spade member and the pole section.

17. The handling pole of claim 9, wherein the upper sleeve is stainless steel, and
 wherein the lower sleeve is stainless steel.

18. The handling pole of claim 9, wherein the pole adapter is made from an aluminum material,
 wherein the spade member is made from the aluminum material, or
 wherein the pole adapter and the spade member are made from the aluminum material.

19. The handling pole of claim 9, wherein the spade member includes a stainless steel spade pin to slidably engage into a corresponding J-shaped slot on the third handling pole.

20. The handling pole of claim 19, wherein the spade pin is welded to the spade member at both sides of the spade member.

* * * * *